United States Patent [19]

Ishikawa et al.

[11] 4,445,777
[45] May 1, 1984

[54] OPTICAL SYSTEM OF A THEODOLITE

[75] Inventors: Yuzuru Ishikawa; Masashi Tanaka, both of Kawasaki, Japan

[73] Assignee: Nippon Kogaku K.K., Tokyo, Japan

[21] Appl. No.: 458,707

[22] Filed: Jan. 17, 1983

Related U.S. Application Data

[63] Continuation of Ser. No. 215,342, Dec. 11, 1980, abandoned.

[30] Foreign Application Priority Data

Dec. 27, 1979 [JP] Japan .............................. 54-171446

[51] Int. Cl.³ .............................................. G01C 1/00
[52] U.S. Cl. ..................................... 356/139; 33/281; 356/147
[58] Field of Search .................. 356/139, 147; 33/281, 33/282, 285

[56] References Cited

U.S. PATENT DOCUMENTS 2,363,877 11/1944 Larsen et al. ....................... 356/139
2,552,893 5/1951 Hillman et al. ..................... 356/139
2,837,956 6/1958 Schneider ............................ 33/282
3,417,394 12/1968 Sauberlich .......................... 33/281
3,557,458 1/1971 Shultz ................................. 33/281

Primary Examiner—R. A. Rosenberger
Attorney, Agent, or Firm—Fitzpatrick, Cella, Harper & Scinto

[57] ABSTRACT

An optical system of a theodolite has an altitude angle scale plate having an altitude scale, a horizontal angle scale plate having a horizontal angle scale, a light path combining member for combining the light paths from the two scale plates, a rectangular prism member provided between one of the two scale plates and the light path combining member and having slant faces orthogonal to each other, the light beam from said one of the two scale plates being reflected by the inner surfaces of the orthogonal slant faces of the rectangular prism and thereafter reaching the light path combining member, an objective lens disposed at the exit side of the light path combining member to form the images of the scales on the two scale plates and a focusing screen on which the images of the scales by the objective lens are formed.

9 Claims, 4 Drawing Figures

OPTICAL SYSTEM OF A THEODOLITE

This is a continuation of application Ser. No. 215,342, filed Dec. 11, 1980, now abandoned.

BACKGROUND OF THE INVENTION

1. Field of the Invention

This invention relates to an optical system for reading the altitude angle scale and the horizontal angle scale of a theodolite in the same view field.

2. Description of the Prior Art

As the optical system of the device of this type, there has been a construction as shown in FIG. 1 of the accompanying drawings wherein an altitude angle scale 1a (hereinafter referred to as the V scale) formed on an altitude angle scale plate 1 is imaged on the same plane as a horizontal angle scale 2a (hereinafter referred to as the H scale) formed on a horizontal angle scale plate 2 by a relay lens 3, and is further imaged on a focusing screen 5 by an objective lens 4 through prisms 13 and 14, and further the reading of the V scale and the H scale is effected by an eye-piece 6 through a prism 15. There has also been a construction as shown in FIG. 2 of the accompanying drawings wherein the V scale 1a on an altitude angle scale plate 1 and the H scale 2a on a horizontal angle scale plate 2 are imaged on a focusing screen 5 by two objective lenses 4 and 4' provided on different light paths and the V and H scales are read through an eye-piece 6. In either of these constructions, two imaging systems such as a relay lens and an objective lens have been requisite and this has meant a great number of lenses required and accordingly a complicated construction and also, the adjustment of the same focus and the adjustment for obtaining a predetermined magnification have been difficult and required a long time. Particularly, in the former construction (FIG. 1), the H scale is imaged once, whereas the V scale is imaged twice and this has led to a disadvantage that there occurs a difference between the resolving powers of the two scales.

SUMMARY OF THE INVENTION

It is an object of the present invention to eliminate the above-noted disadvantages, to make the showings of the V scale and the H scale entirely identical and to provide an optical system of a theodolite which is simple in construction.

The optical system of a theodolite according to the present invention uses a single objective lens for forming the images of the V scale and the H scale in the conventional optical system having an objective lens, a focusing screen and an eye-piece. Therefore, a light path combining member is provided for combining the light ray from the V scale and the light ray from the H scale, and a rectangular prism is provided in the light path between the light path combining member and the H scale so that light is twice reflected by the inner surfaces of the orthogonal slant faces of the rectangular prism and thereafter reaches the light path combining member, thereby correcting the light path difference between the two scales and the light path combining member and also causing the light rays from the two scales leaving the light path combining member to be condensed on a focusing screen by an objective lens as the only imaging system.

The invention will become more fully apparent from the following detailed description thereof taken in conjunction with the accompanying drawings.

DESCRIPTION OF THE PREFERRED EMBODIMENTS

The invention will hereinafter be described with respect to embodiments thereof.

Figure 1:
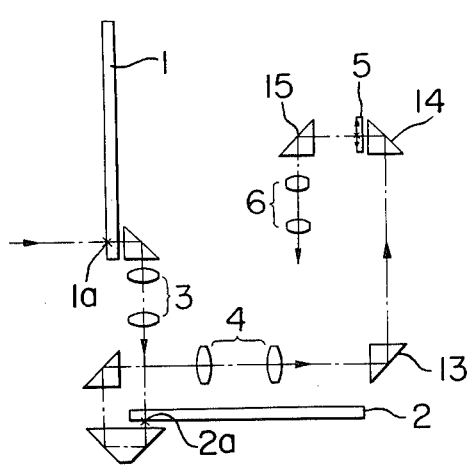
FIGS. 1 and 2 show the light paths in the optical systems according to the prior art.
Figure 2:
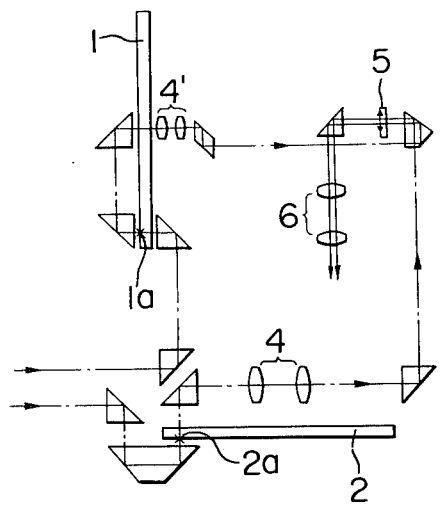
Figure 3:
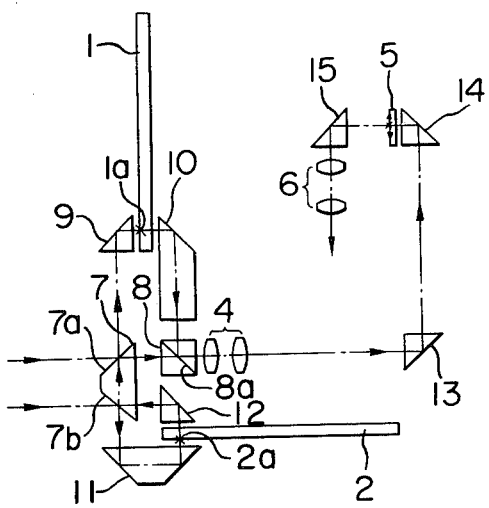
FIG. 3 shows the light path in the optical system according to a first embodiment of the present invention.

FIG. 3 shows the light path of a first embodiment of the present invention. In FIG. 3, reference numerals identical to those in FIGS. 1 and 2 designate members equivalent to those described previously. The surfaces of the orthogonal slant faces 7a and 7b of a rectangular prism 7 are mirror surfaces, and the inner surface and surface of the two slant faces are reflecting surfaces, and an illuminating light incident thereon is reflected upwardly and downwardly by the slant faces 7a and 7b, respectively, as viewed in FIG. 3. The illuminating light upwardly reflected by the slant face 7a of the rectangular prism 7 illuminates a V scale plate 1 through a prism 9, and the light ray from the V scale 1a passes through a prism 10 into a semi-transmitting prism 8. On the other hand, the light rays downwardly reflected by the slant face 7b of the rectangular prism 7 illuminate an H scale plate 2 through a prism 11, and the light ray from the H scale 2a is reflected by a prism 12 and again reaches the rectangular prism 7, and is inwardly reflected by the two slant faces 7b and 7a, and thereafter passes to the semi-transmitting prism 8. The light ray from the V scale 1a is reflected by the semi-transmitting surface 8a of the semi-transmitting prism 8, and the light ray from the H scale 2a passes through the semi-transmitting surface 8a. Both of these light rays are subjected to the action of an objective lens 4, pass through prisms 13 and 14, are condensed on a focusing screen 5, and then reach an eye-piece 6 through a prism 15.

In such a construction, correction of the lengths of the light paths of the V scale 1a and the H scale 2a is simply achieved by slightly moving only the rectangular prism 7 toward the optical axis of the objective lens 4. Also, the imaging system is of a simple construction comprising the objective lens 4 alone and is used in common for the reading of the two scales and therefore, both the definitions and magnifications of the images of the two scales are completely coincident.

In the above-described first embodiment, the semi-transmitting prism 8 performs the function of a light path combining member which combines the light rays from the two scales, whereas such a so-called amplitude dividing member is not the only possible construction but it is also possible to combine the light paths from the two scales by a wave surface dividing member. That is, as in a second embodiment of the present invention shown in FIG. 4, a construction in which the light paths from the scales 1a and 2a are parallel to each other with the optical axis of the objective lens 4 as the boundary.

Figure 4:
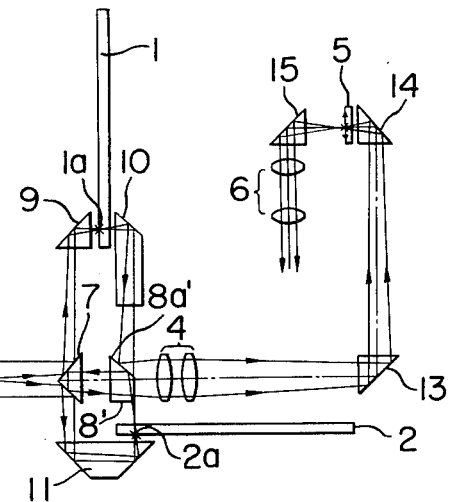
FIG. 4 shows the light path in the optical system according to a second embodiment of the present invention.

In FIG. 4, reference numerals identical to those in FIG. 3 designate members equivalent to those in the first embodiment. The construction of the second embodiment is substantially identical to the construction of the first embodiment except that a prism 8' having a slant face 8a' is employed as the light path combining member. This slant face 8a' is designed to reflect light in the interior and surface of the prism. The light ray from the V scale 1a is reflected by the slant face 8a' of the prism 8' and enters the upper half of the objective lens 4 with the optical axis thereof as the boundary while, on the other hand, the light from the H scale 2a enters the prism 8', is reflected by the inner surface of the slant face 8a', exits from this prism 8' and is twice reflected by the orthogonal slant faces of the rectangular prism 7, whereafter the light again reaches and passes through the prism 8' and enters the lower half of the objective lens 4 with the optical axis thereof as the boundary. Both of the light rays from the two scales are condensed on the focusing screen 5 to form scale images which may be viewed through the eye-piece 6.

Again in such construction of the second embodiment, only one objective lens is adopted as the imaging system and correction of the light path difference between the two scales can be simply accomplished by movement of the rectangular prism 7 alone. In the above-described embodiment, the two orthogonal slant faces of the rectangular prism 7 are made into reflecting surfaces and the light rays reflected by these surfaces illuminate the scale plates, and such construction leads to a reduced number of parts and thus, a simpler scale reading optical system.

According to the present invention, as has been described above, the use of the same objective lens leads to an advantage that the optical performances of the V scale and the H scale are identical to each other and in addition, leads to the provision of a scale reading optical system of a theodolite in which the same focus and magnification adjustment are easy and which requires a reduced number of lenses and accordingly is simple in construction.

We claim:
1. An optical system of a theodolite comprising:
   (a) an altitude angle scale plate having an altitude angle scale;
   (b) a horizontal angle scale plate having a horizontal angle scale;
   (c) a light path combining member for combining the light paths from said two scale plates;
   (d) a rectangular prism member provided between one of said two scale plates and said light path combining member and having slant faces orthogonal to each other, outer surfaces and inner surfaces of said two slant faces of said rectangular prism member being reflecting surfaces, a light beam reflected on the one of said outer reflecting surfaces illuminating said one of said two scale plates, and then being reflected by said inner reflecting surfaces and thereafter reaching said light path combining member;
   (e) an objective lens for forming the images of the scales on said two scale plates; and
   (f) a focusing screen on which the images of said scales by said objective lens are formed.
2. An optical system according to claim 1, wherein said objective lens is disposed at the exit side of said light path combining member.

3. An optical system according to claim 2, wherein a light beam reflected on the outer of said outer surfaces illuminating the outer of said two scale plates.
4. An optical system according to claim 2, wherein said rectangular prism member is provided in the light path between said horizontal angle scale plate and said light path combining member.
5. An optical system according to claim 4 wherein said light path combining member is a semi-transmitting prism having a semi-transmitting surface, a light from said altitude angle scale being reflected to said objective lens at said semi-transmitting surface, and a light beam from said horizontal angle scale being reflected to said rectangular prism at said semi-transmitting surface and passed through said semi-transmitting surface after inner reflections at said two slant surfaces of said rectangular prism member.
6. An optical system according to claim 4, wherein said light path combining member includes a prism member having a slant reflecting surface and a transparent surface adjacent to said slant reflecting surface, a light beam from said horizontal angle scale being internally reflected to said rectangular prism member, at said slant reflecting surface and passed through said trnasparent surface after inner reflections at said two slant surfaces of said rectangular prism member.
7. A theodolite for showing images both of an altitude angle scale and a horizontal angle scale, comprising:
   an altitude angle scale plate having the altitude angle scale;
   a horizontal angle scale plate having the horizontal angle scale;
   light path combining means for combining light beams from said altitude angle scale plate and from said horizontal angle scale plate;
   common image forming means for both the light beams from said altitude angle scale plate and from said horizontal angle scale plate, consisting essentially of an objective lens and a focusing plate disposed at the exit side of said light path combining means; and
   said altitude angle scale plate being conjugate with said focusing plate with respect to said objective lens, and said horizontal angle scale plate being also conjugate with said focusing plate with respect to said objective lens;
   whereby the images of the altitude angle scale and the horizontal angle scale are formed on said focusing plate in substantially identical optical performances.
8. A theodolite according to claim 7, wherein said light path combining means includes a light path combining prism member for combining light beams from said altitude angle scale plate and from said horizontal angle scale plate, and a light path compensating prism member disposed in the light path between at least one of said two scale plates and said light path combining prism member.
9. A theodolite according to claim 8, wherein said light path compensating prism member disposed in the light path between at least one of said two scale plates and said light path combining prism member comprises a rectangular prism having slant surfaces orthogonal to each other, a light beam from said one of said two scale plates being reflected by the respective inner surfaces of the orthogonal slant faces of said rectangular prism and thereafter reaching said light path combining prism member.

* * * * *